Aug. 11, 1964     B. S. DARLOW     3,144,587

DISTRIBUTION PANEL

Filed Oct. 9, 1959     2 Sheets-Sheet 1

INVENTOR

BRIAN S. DARLOW

BY: *Featherstonhaugh & Co.*

ATTORNEYS

United States Patent Office 3,144,587
Patented Aug. 11, 1964

3,144,587
DISTRIBUTION PANEL
Brian S. Darlow, London, Ontario, Canada, assignor to Taylor Electric Mfg. Co., Limited, London, Ontario, Canada
Filed Oct. 9, 1959, Ser. No. 845,566
1 Claim. (Cl. 317—119)

This invention relates to an electrical distribution panel.

It is common practice to provide a distribution panel for small load use that has means for mounting a plurality of mechanical circuit breakers of the type illustrated in United States Patents Nos. 2,303,959, 2,319,262, 2,360,684, 2,370,206, 2,372,778, 2,422,779, 2,429,722, 2,678,359, and 2,701,284.

These distribution panels generally comprise a series of bus bars over which the circuit breakers are mounted in pairs with their ends in spaced apart relation and means for connecting each pair of circuit breakers to a particular bus bar whereby electrical circuits can be established through the breakers. It has been common to provide a connector to extend between the top front end terminals of the breakers which are spaced a substantial distance apart and to provide a second connector to extend downwardly from the joining connector to an appropriate bus bar. This invention provides a means for connecting the breakers to each of the bus bars when the front ends of the breakers are in close relationship to each other and thereby materially reduces the width of the distribution panel.

The invention also provides a novel manner for mounting the bus bars in the casing in spaced relation to each other which eliminates the possibility of electrical break down due to creepage across accumulated dust on the bus bar mounting block.

The invention will be clearly understood after reference to the following detailed specification read in conjunction with the drawings.

Figure 1:
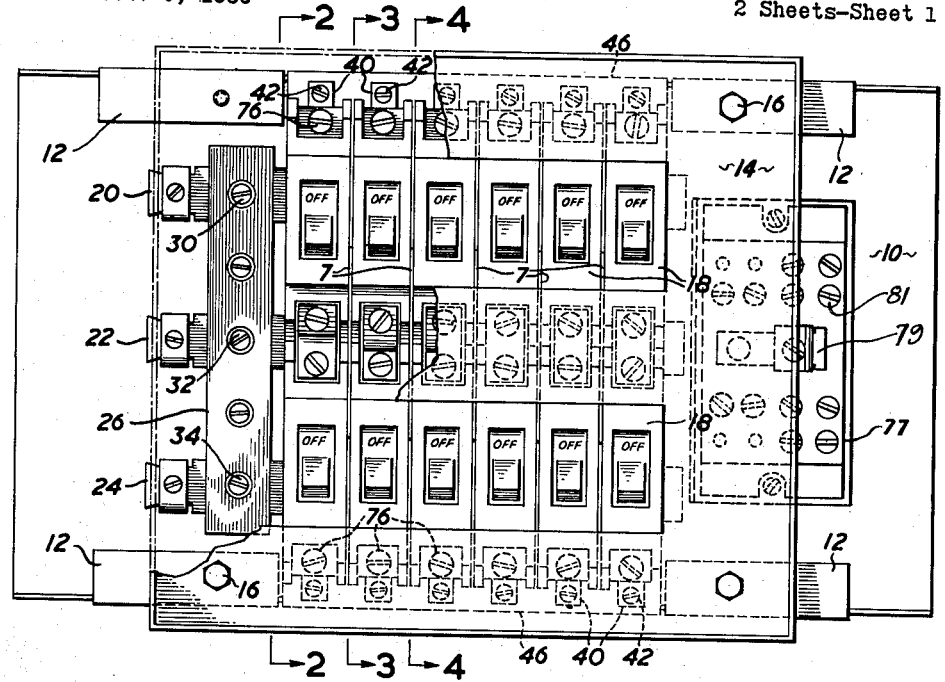
FIGURE 1 is a plan view of a distribution panel according to the invention.

Referring to the drawings, the distribution panel thereshown has a casing formed from a bottom section 10 with side flanges to the ends of which are secured top supporting members 12 adapted to support the top cover tray 14. Tray 14 is bolted into position by means of screws 16 that enter into the top flange of the top supporting members 12. A central opening is provided to expose the toggle handles of the circuit breakers 18 which are of well known design and of the type described in the above mentioned patents.

Figure 2:
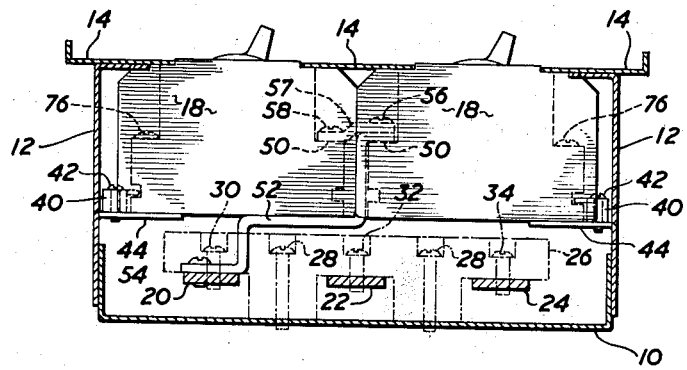
FIGURE 2 is a view along the line 2—2 of FIGURE 1.

Three bus bars 20, 22 and 24 are rigidly mounted within the casing or base and electrically insulated therefrom. The numeral 26 refers to a block of insulating material mounted to the bottom 10 of the casing by means of the screws 28. It is formed on its underside with spaced apart undercut portions to which the bus bars 20, 22 and 24 are secured by means of screws 30, 32 and 34, respectively to mount them in spaced and insulating relationship to each other and to the casing. In FIGURE 2 an end view of the mounting block 26 has been indicated in dotted lines. It will be appreciated that the mounting block is to the left of the section line in FIGURE 1 and would not normally be visible in the indicated direction of FIGURE 2.

It will be noted that because the bus bars are mounted in spaced undercut portions of a block that breakdown due to creepage along accumulated dirt on the mounting block is almost impossible.

The circuit breakers 18 are mounted on the base by means of clamps 40 that are screwed down tightly by means of screws 42 to the horizontally extending flange 44 of the breaker support brackets 46. Breaker support brackets 46 are secured by welding or other suitable means to side flanges of the bottom 10 of the casing between the top supports 12.

It will be noted that clamps 40 have a locking finger that engages in an appropriate notch in the back end of each of the breakers.

It will also be noted that each of the breakers has a front end contact 50 and that the breakers are arranged in the assembly in pairs with their front ends adjacent each other. Connectors are provided for connecting the front end contact of each pair of breakers to a common bus bar.

In FIGURE 2, there is illustrated the means for connecting the pair of breakers seen along that section to the bus bar 20. Connection is effected by means of a first copper bar connector 52 which connects at one of its ends with the bus bar 20 by means of the screw 54, extends firstly along the underside of a breaker and then, vertically in an upward direction to connect at its other end with a front contact 50 of a breaker 18 by means of the screw 56. A second copper bar connector 57 joins the front terminals of the breakers and is secured by terminal bolts 56 and 58. Thus the front end terminals of each of the pair of breakers of FIGURE 2 are electrically connected to bus bar 20 whereby a circuit can be completed from the bus bar and through the breaker.

Figure 3:
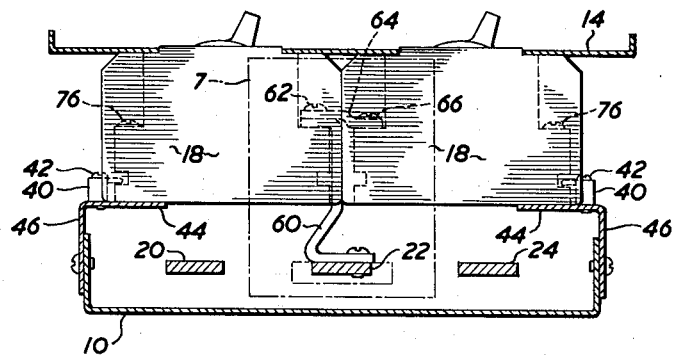
FIGURE 3 is a view along the line 3—3 of FIGURE 1.

In FIGURE 3, the means for connecting bus bar 22 to a pair of circuit breakers is illustrated. In this instance, the first connector 60 extends in a vertical direction between the front ends of the circuit breakers for connection at its upper end with the front end contact of the breaker 18 through the bolt 62. A second connector 64 similar to the connector 56 electrically connects the front terminals of each breaker of the pair through the bolts 62 and 66.

Figure 4:
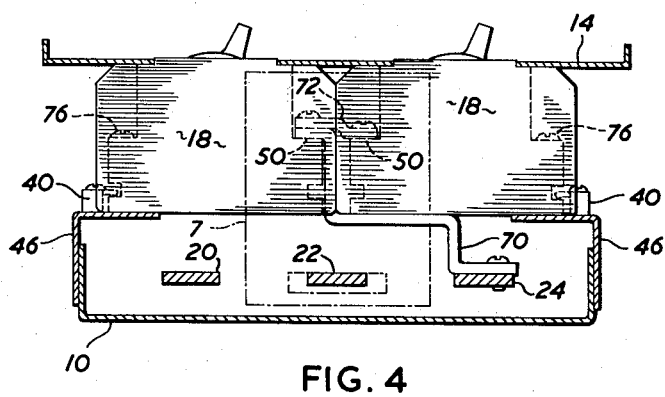
FIGURE 4 is a view along the line 4—4 of FIGURE 1.

In FIGURE 4 the means for connecting a bus bar 24 to a pair of breakers 18 is illustrated. In this particular case, the connector 70 and the connector 72 are the converse of the connectors 52 and 56 previously described, and are similarly connected to the circuit breakers by means of appropriate bolts as illustrated.

Each pair of breakers in the panel is connected to a bus bar in one of the manners illustrated.

It will be noted that the breakers of each pair are supported with their front ends in end to end relation to each other and in juxtaposition to an upwardly extending portion of a connector that extends from an underlying bus bar, the said connector in each case having its upper end formed for direct connection to a front terminal of a circuit breaker.

A piece of insulating board 7 threaded onto the central bus bar and supported thereby provides electrical insulation between the front end of breakers in adjacent pairs.

Each of the breakers has a terminal adjacent its back end as at 76 and in use, when the breakers are closed, power is supplied to the bus bars 20, 22 and 24, travels through the connectors to the front end contacts of the breakers, through the breakers, and out the back end terminals 76 of the breakers.

Means are provided for connecting the back end terminals of the breakers to various circuits and in this connection it is common practice to provide what is known as a solid neutral block 77. This block 77 is mounted on the base but is insulated therefrom. It has a terminal 79 for connection to the neutral terminal of the output side of a distribution transformer secondary and a terminal 81 corresponding to each of the breakers 18 whereby in use protected load circuits can be arranged through the breakers according to standard practice.

Thus, on and off controls and overload control is achieved through the breakers mounted in the panel. The manner of using control panels of the type under consideration is well known and further comment is thought unnecessary.

Embodiments of the invention other than the one illustrated will be apparent to those skilled in the art and it is not intended that the scope of the invention should be limited to the embodiments illustrated.

I claim:

A distribution panel comprising a base, bus bars, means for supporting said bus bars in insulating relation on said base, a plurality of circuit breakers, said circuit breakers each having a front end and a back end, support means for supporting said circuit breakers on said base in pairs with the front end of each breaker in end to end relation to the front end of the breaker with which it forms a pair, said support means for each pair of said breakers comprising two diametrically opposed brackets and connector means that cooperates therewith, said brackets being carried by said base each supporting one of its respective pair of breakers adjacent its back end, said connector means comprising a first connector and a second connector, said first connector being rigidly connected at one of its ends to one of said bus bars and being rigidly connected at the other of its ends to the front end of the first breaker of its respective pair of breakers, said second connector being rigidly connected at one of its ends to the front end of said first connector and being rigidly connected at the other of its ends to the front end of the second breaker of its respective pair, said first connector extending for a portion of its extent between and in abutting relation to the front ends of its pair of breakers.

References Cited in the file of this patent

UNITED STATES PATENTS

| | | |
|---|---|---|
| 2,199,626 | Freese | May 7, 1940 |
| 2,351,942 | Dyer | June 20, 1944 |
| 2,766,405 | Edmunds | Oct. 9, 1956 |
| 2,790,113 | Brown | Apr. 23, 1957 |
| 2,871,284 | Wills | Jan. 27, 1959 |